(12) United States Patent
Huang et al.

(10) Patent No.: US 9,768,681 B2
(45) Date of Patent: Sep. 19, 2017

(54) FILTERING MODULE AND POWER SUPPLY DEVICE

(71) Applicant: Chicony Power Technology Co., Ltd., New Taipei (TW)

(72) Inventors: Wen-Nan Huang, New Taipei (TW); Ching-Guo Chen, New Taipei (TW); Shiu-Hui Lee, New Taipei (TW); Ching-Chou Tseng, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/008,132

(22) Filed: Jan. 27, 2016

(65) Prior Publication Data

US 2017/0214316 A1    Jul. 27, 2017

(51) Int. Cl.
*H02M 1/44* (2007.01)
*H03H 7/01* (2006.01)

(52) U.S. Cl.
CPC ............ *H02M 1/44* (2013.01); *H03H 7/0115* (2013.01)

(58) Field of Classification Search
CPC .............................. H02M 1/44; H03H 7/0115
See application file for complete search history.

(56) References Cited

U.S. PATENT DOCUMENTS

| | | | |
|---|---|---|---|
| 3,921,085 A | 11/1975 | Keane | |
| 9,071,144 B2* | 6/2015 | He | H02M 1/44 |
| 9,525,364 B2* | 12/2016 | Garrity | H02M 1/36 |
| 2007/0211498 A1* | 9/2007 | Van Casteren | H02M 1/4208 363/16 |
| 2012/0104965 A1* | 5/2012 | Gergely | H05B 33/0809 315/291 |
| 2014/0152403 A1* | 6/2014 | Park | H01P 1/2053 333/202 |
| 2014/0159608 A1* | 6/2014 | Simi | H05B 33/0815 315/205 |
| 2014/0253261 A2 | 9/2014 | Korber | |
| 2017/0005581 A1* | 1/2017 | Fukumasu | H02M 3/28 |

OTHER PUBLICATIONS

Office Action dated Apr. 19, 2017 of the corresponding Taiwan patent application No. 104141777.

* cited by examiner

*Primary Examiner* — Jeffrey Zweizig
(74) *Attorney, Agent, or Firm* — Chun-Ming Shih; HDLS IPR Services

(57) ABSTRACT

A filtering module includes a first inductor and a first capacitor. The first inductor has a first inductance varied by varying the current into the first inductor. The first capacitor is electrically connected to the first inductor. The filtering bandwidth of the filtering module is varied by varying the current into the filtering module.

15 Claims, 3 Drawing Sheets

FILTERING MODULE AND POWER SUPPLY DEVICE

BACKGROUND OF THE INVENTION

Field of the Invention

The present disclosure relates to a filtering module and a power supply device. More particularly, the present disclosure relates to an electromagnetic interference (EMI) filter and a power supply device with the electromagnetic interference filter.

Description of Related Art

Reference is made to FIG. 1, which is a schematic view of a conventional inductor. The inductor 3 includes a magnetic core 30, a primary winding 32, and a secondary winding 34. The magnetic core 30 has a toroidal shape, and an outer surface and an inner surface of the magnetic core 30 are smooth surface. The primary winding 32 and the secondary winding 34 are wound on the magnetic core 30. When a current is conducted to the primary winding 32, an induced current is generated in the secondary winding 34.

The inductor 3, however, has a constant inductance; i.e. no matter the inductor 3 is operated under heavy current or light current condition, the inductor 3 has the same inductance. As such, the gain and corner frequency (and/or the center frequency) of the electromagnetic inference filter cannot be adjusted.

SUMMARY OF THE INVENTION

According to one aspect of the present disclosure, the filtering module includes a first inductor and a first capacitor. The first inductor has a first inductance varied by varying a current into the first inductor, and the first capacitor is electrically connected to the first inductor. A filtering bandwidth of the filtering module is varied by varying the current into the filtering module.

In an embodiment of the present disclosure, the filtering module can further include a second inductor and a second capacitor. The second inductor is arranged between the first inductor and the first capacitor and electrically connected to the first capacitor and the first inductor. Specifically, the second inductor is electrically connected to the first capacitor in parallel. The second capacitor is electrically connected to the first inductor. The filtering bandwidth of the filtering module is varied by varying the current into the filtering module, and the second inductor is configured to filter noises existing in the current passed through the first inductor.

Moreover, the second inductor can have a second inductance varied by varying the current into the second inductor, and a variance of the second inductance causes by the current into the second inductor can be the same as a variance of the first inductance causes by the current into the first inductor. The first inductance and the second inductance can decrease with increasing current, the filtering bandwidth of the filtering module reduces with decreasing first inductance and second inductance, and a center frequency of the filtering module reduces with increasing current.

Furthermore, the second inductor can have a second inductance varied by varying the current into the second inductance, and a variance of the second inductance causes by the current into the second inductor is different from a variance of the first inductance causes by the current into the first inductor.

According to another aspect of the present disclosure, a power supply device includes a power conversion module and the filtering module mentioned above. The filtering module is electrically connected to the power conversion module and is arranged between an input terminal of the power supply device and the power conversion module. The filtering module can be configured to filter electromagnetic interference.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

A preferred embodiment of the present invention will be described with reference to the drawings.

Figure 1:
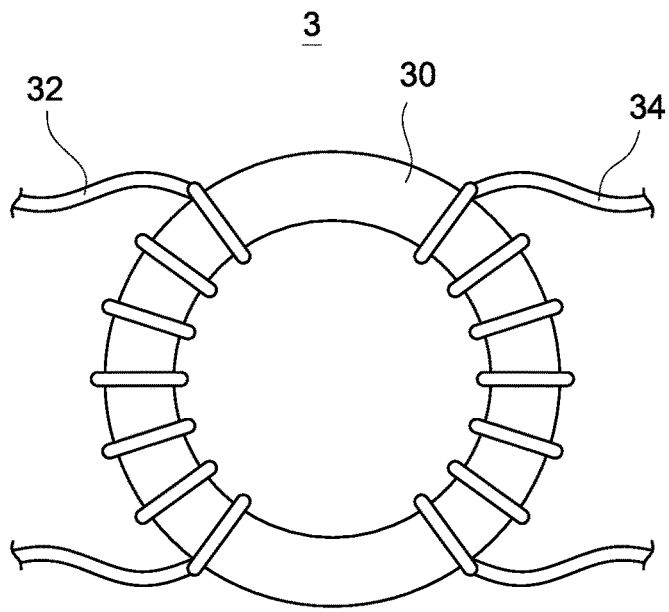
FIG. 1 is a schematic view of a conventional inductor.
Figure 2:
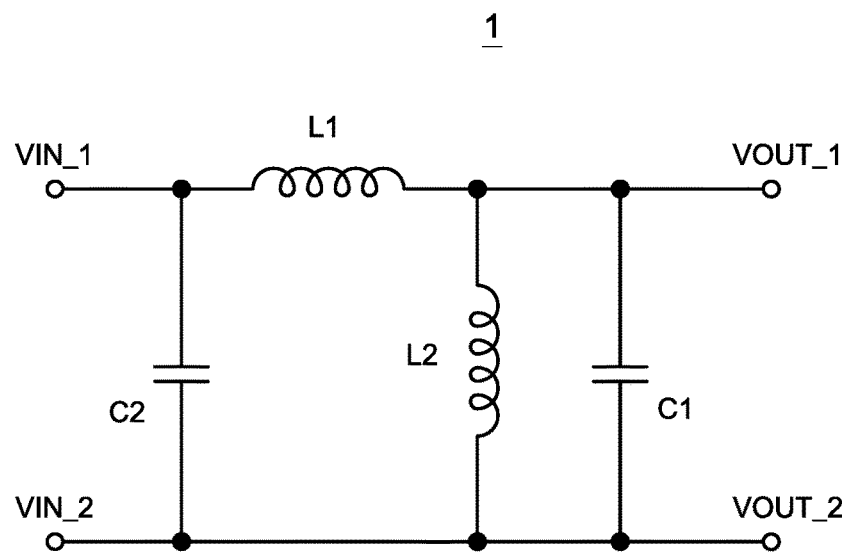
FIG. 2 is a circuit diagram of a filtering module according to the present invention.

Reference is made to FIG. 2, which is a circuit diagram of a filtering module according to the present invention. In FIG. 2, the filtering module 1 includes a first inductor L1, a first capacitor C1, a first input line VIN_1, a second input line VIN_2, a first output line VOUT_1, and second output line VOUT_2. One terminal of the first inductor L1 is electrically connected to the first input line VIN_1, and the other terminal of the first inductor L1 is electrically connected to the first output line VOUT_1 and one terminal of the first capacitor C1. The other terminal of the first capacitor C1 is electrically connected to the second input line VIN_2 and the second output line VOUT_2.

Figure 3:
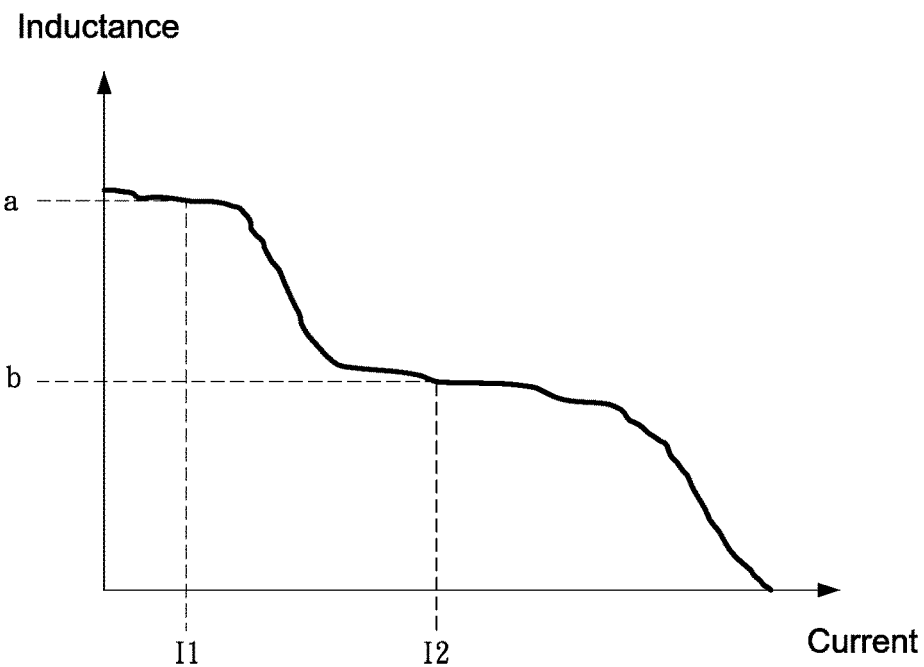
FIG. 3 shows a plot of inductance versus current for a magnetic component according to the present invention.

The first inductor L1 has a first inductance changes with current. Specifically, the first inductance of the first inductor L1 is varied by varying the current into the first inductor L1, and the first inductor L1 may have the first inductance that decreases with increasing current (as shown in FIG. 3). In FIG. 3, the variable inductance characteristic results a relatively large inductance (such as the inductance a) at low current (the first current I1) and a relatively small inductance (such as the inductance b) at high current (the second current I2). As a result, the inductance falls to a desired low value at high currents.

Figure 4:
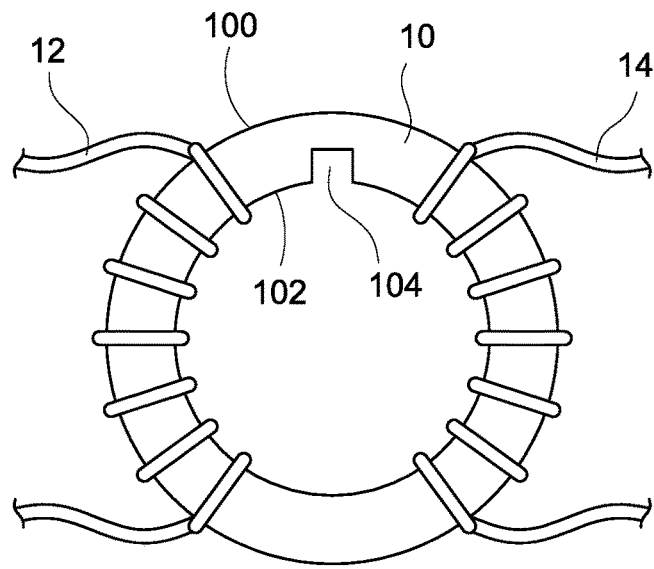
FIG. 4 is a schematic view of the magnetic component according to the present invention.

Referred is made to FIG. 4, which is a schematic view of the magnetic component according to the present invention. In FIG. 4, the magnetic component (its reference numeral is omitted) includes a magnetic core 10, a primary winding 12, and a secondary winding 14. The magnetic core 10 has a toroidal shape, and includes an outer surface 100 and an inner surface 102. The magnetic core 10 further includes a recess 104 thereon, and the recess 104 is, for example, concave from the inner surface 102 to the outer surface 100. The profile of the recess 104 is, for example, a rectangular.

The primary winding 12 and the secondary winding 14 are wound on the magnetic core 10. The primary winding 12 is, for example, wound on the left side of the magnetic core 10, and the secondary winding 14 is, for example, wound on the right side of the magnetic core 10 (as can be seen in FIG. 4). The recess 104 formed on the magnetic core 10 makes the magnetic resistance of the magnetic component varied by varying the magnetic flux path at different currents into the magnetic component, thus the magnetic component has the inductance changes with current, and FIG. 3 shows a plot of inductance versus current for the magnetic component.

Referred is now back to FIG. 2, the filtering module 1 further includes a second inductor L2 and a second capacitor C2. One terminal of the second inductor L2 is electrically connected to the first inductor L1, the first capacitor C1, and the first output line VOUT_1, and the other terminal of the second inductor L2 is electrically connected to the second input line VIN_2 and the second output line VOUT_2 (i.e. the second inductor L2 is electrically connected to the first capacitor C1 in parallel). One terminal of the second capacitor C2 is electrically connected to the first input line VIN_1 and the first inductor L1, and the other terminal thereof is electrically connected to the second input line VIN_2 and the second output line VOUT_2, the second capacitor C2 is configured to resist differential-mode interference. The first capacitor C1 is configured to resist common-mode interference.

The second indictor L2 has a second inductance changes with current. Specifically, the second inductance of the second inductor L2 is varied by varying the current into the second inductor L2, and the second inductor L2 may have the second inductance that decreases with increasing current (as shown in FIG. 3). The variance of the second inductance of the second inductor L2 causes by varied current may be the same as that of the first inductance of the first inductor L1. In the other words, the second inductor L2 has the inductance a when the first current I1 shown in the FIG. 3 flowing therethrough, and the second inductor L2 has the inductance b when the second current I2 shown in FIG. 3 flowing therethrough. Furthermore, the second inductor L2 may be the magnetic component shown in the FIG. 4. It should be noted that the second inductor L2 is configured to filter the noise existing in the current passed through the first inductor L1 (i.e. the second inductor L2 filters the noise existing the filtered current which is filtered by the first inductor L1).

Figure 5:
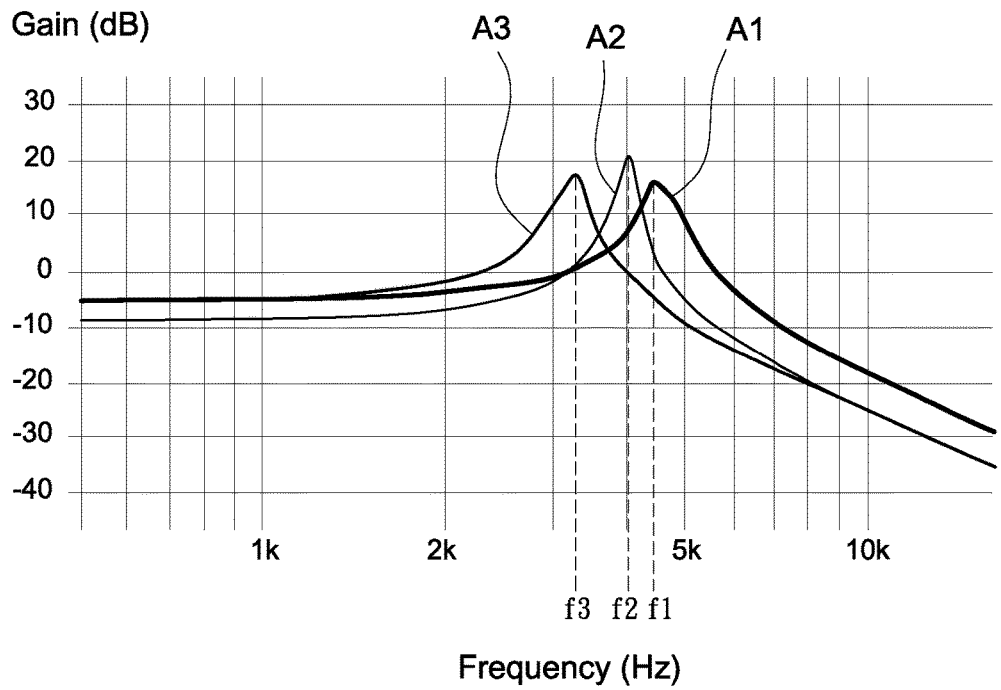
FIG. 5 is a plot of gain versus frequency for the filtering module according to the present invention.

Referred is made to FIG. 5, which is a plot of gain versus frequency for the filtering module according to the first embodiment of the present invention. The curve A1 shown in FIG. 5 represents the first inductance of the first inductor L1 and the second inductance of the second inductor L2 decrease with increasing current, and the curve A2 represents the first inductance of the first inductor L1 and the second inductance of the second inductor L2 increase with increasing current. In FIG. 5, the curve A1 has a first center frequency f1, the curve A2 has a second center frequency f2, the first center frequency f1 is larger than the second center frequency f2, and the filtering bandwidth of the curve A1 is larger than that of the curve A2.

Furthermore, the curve A3 shown in FIG. 5 represents that the variance of the second inductance of the second inductor L2 causes by varied current is different from that of the first inductance of the first inductor L1, and the variance of the second inductance of the second inductor L2 is smaller than that of the first inductance of the first inductor L1. The first center frequency f1 of the curve A1 and the second center frequency of the curve A2 are larger than a third center frequency f3 of the curve A3, and the filtering bandwidth of the curve A3 is larger than that of curve A2.

Figure 6A:
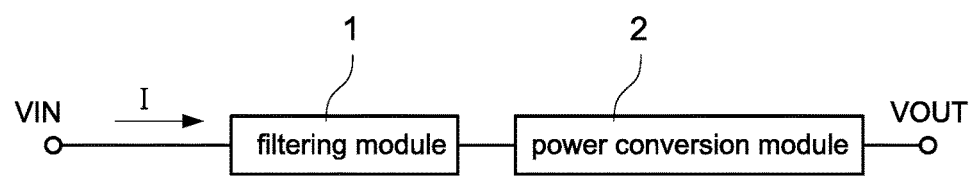
FIG. 6a is a circuit block diagram of a power supply device according to the present invention.
Figure 6B:
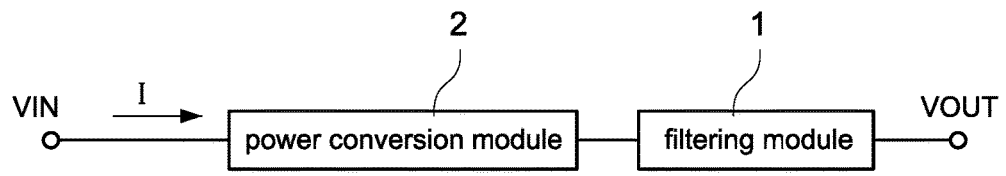
FIG. 6b is another circuit block diagram of a power supply device according to the present invention.

Reference is made to FIG. 6a, which is a circuit block diagram of a power supply device according to the present invention. The power supply device (its reference numeral is omitted) has an input terminal VIN and an output terminal VOUT, an alternative current (AC) electric power enters the power supply device by the input terminal VIN. The power supply device includes a filtering module 1 mentioned above and a power conversion module 2, the filtering module 1 is arranged between the input terminal VIN and the power conversion module 2, and is configured to filtering electromagnetic interference (such as common-mode noise or differential-mode noise) existing in the AC electric power for satisfying EMI and power quality requirement. The filtering bandwidth of the filtering module 1 changes with the current into the filtering module 1. In the practical application, the filtering module 1 may be arranged between the power supply device 2 and the output terminal OUT (as shown in FIG. 6b), and is configured to filtering ripple existing in the electric power outputted from the power conversion module 2.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A filtering module comprising:
 a first inductor comprising a magnetic core, wherein a recess formed on the magnetic core makes a magnetic resistance of the magnetic core be varied by varying a magnetic flux path at different currents into the magnetic core, thereby a first inductance of the first inductor is varied; and
 a first capacitor electrically connected to the first inductor, wherein a filtering bandwidth of the filtering module is varied by varying the current into the filtering module.

2. The filtering module of claim 1, further comprising:
 a second inductor arranged between the first inductor and the first capacitor and electrically connected to the first capacitor and the first inductor, wherein the second inductor is electrically connected to the first capacitor in parallel; and
 a second capacitor electrically connected to the first inductor,
 wherein the filtering bandwidth of the filtering module is varied by varying the current into the filtering module, and the second inductor is configured to filter noises existing in the current passed through the first inductor.

3. The filtering module of claim 2, wherein the second inductor has a second inductance varied by varying the current into the second inductor, and a variance of the second inductance causes by the current into the second inductor is the same as a variance of the first inductance causes by the current into the first inductor.

4. The filtering module of claim 3, wherein the first inductance and the second inductance decrease with increasing current, and the filtering bandwidth of the filtering module reduces with decreasing first inductance and second inductance.

5. The filtering module of claim 4, wherein a center frequency of the filtering module reduces with increasing current.

6. The filtering module of claim 2, wherein the second inductor has a second inductance varied by varying the current into the second inductance, and a variance of the second inductance causes by the current into the second inductor is different from a variance of the first inductance causes by the current into the first inductor.

7. The filtering module of claim 2, wherein a center frequency of the filtering module is varied by varying the current into the filtering module.

8. A power supply device having an input terminal comprising:
   a power conversion module; and
   a filtering module electrically connected to the power conversion module, the filtering module comprising:
      a first inductor comprising a magnetic core, wherein a recess formed on the magnetic core makes a magnetic resistance of the magnetic core be varied by varying a magnetic flux path at different currents into the magnetic core, thereby a first inductance of the first inductor is varied; and
      a first capacitor electrically connected to the first inductor,
   wherein a filtering bandwidth of the filtering module is varied by varying the current into the filtering module.

9. The power supply device of claim 8, wherein the filtering module is arranged between the input terminal and the power conversion module and is configured to filter electromagnetic interference.

10. The power supply device of claim 8, wherein the filtering module further comprising:
   a second inductor arranged between the first inductor and the first capacitor and electrically connected to the first capacitor and the first inductor, and the second inductor is electrically connected to the first capacitor in parallel; and
   a second capacitor electrically connected to the first inductor,
   wherein the filtering bandwidth of the filtering module is varied by varying the current into the filtering module, and the second inductor is configured to filter noises existing in a filtered current passed through the first inductor.

11. The power supply device of claim 10, wherein the second inductor has a second inductance varied by varying the current entered the second inductor, and a variance of the second inductance causes by the current into the second inductor is the same as a variance of the first inductance causes by the current into the first inductor.

12. The power supply device of claim 11, wherein the first inductance and the second inductance decrease with increasing current, and the filtering bandwidth of the filtering module reduces with decreasing first inductance and second inductance.

13. The power supply device of claim 12, wherein a center frequency of the filtering module decreases with increasing current.

14. The power supply device of claim 10, wherein the second inductor has a second inductance varied by varying the current into the second inductance, and a variance of the second inductance causes by the current into the second inductor is different from a variance of the first inductance causes by the current into the first inductor.

15. The power supply device of claim 10, wherein a center frequency of the filtering module is varied by varying the current into the filtering module.

* * * * *